(12) United States Patent
Kang et al.

(10) Patent No.: US 7,603,143 B2
(45) Date of Patent: Oct. 13, 2009

(54) MOBILE TELECOMMUNICATION HANDSET HAVING TOUCH PAD

(75) Inventors: Yun-Hwan Kang, Seoul (KR); Young-Chul Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 335 days.

(21) Appl. No.: 11/508,886

(22) Filed: Aug. 24, 2006

(65) Prior Publication Data

US 2007/0049358 A1 Mar. 1, 2007

(30) Foreign Application Priority Data

Aug. 26, 2005 (KR) .................... 10-2005-0078807
Mar. 28, 2006 (KR) .................... 10-2006-0028020
May 3, 2006 (KR) .................... 10-2006-0040187

(51) Int. Cl.
*H04M 1/00* (2006.01)
(52) U.S. Cl. ............. 455/566; 455/550.1; 455/575.1
(58) Field of Classification Search ............ 455/566, 455/550.1, 575.1, 73, 556.2, 90.3, 425; 345/173, 345/156, 175
See application file for complete search history.

(56) References Cited

U.S. PATENT DOCUMENTS

| 6,985,137 | B2* | 1/2006 | Kaikuranta | 345/175 |
|---|---|---|---|---|
| 7,009,599 | B2* | 3/2006 | Pihlaja | 345/173 |
| 7,231,231 | B2* | 6/2007 | Kokko et al. | 455/566 |
| 7,292,230 | B2* | 11/2007 | Tokkonen | 345/173 |
| 2005/0253817 | A1* | 11/2005 | Rytivaara et al. | 345/173 |
| 2006/0012577 | A1* | 1/2006 | Kyrola | 345/173 |
| 2007/0150842 | A1* | 6/2007 | Chaudhri et al. | 715/863 |
| 2008/0055263 | A1* | 3/2008 | Lemay et al. | 345/173 |
| 2008/0188267 | A1* | 8/2008 | Sagong | 455/566 |

FOREIGN PATENT DOCUMENTS

KR 10-2003-0022556 A 3/2003

* cited by examiner

*Primary Examiner*—Sonny Trinh
(74) *Attorney, Agent, or Firm*—Birch, Stewart, Kolasch & Birch, LLP

(57) ABSTRACT

A mobile telecommunication handset including a display unit configured to display information, a touch pad configured to generate input when being touched, and a control unit configured to control the display unit and the touch pad and to perform a function corresponding to the generated input from the touch pad being touched. Further, the control unit activates or deactivates the touch pad based on at least one from a state of the mobile handset or an input external from the touch pad.

7 Claims, 15 Drawing Sheets

Cover fold

Deactivate when key input does not occur for a specified amount of time ⇒

Cover fold

FIG. 5C

Cover fold

Activate when long touch occurs in the deactivated state ⇒

Cover fold

MOBILE TELECOMMUNICATION HANDSET HAVING TOUCH PAD

The present invention claims priority to Korean Application Nos. 10-2005-0077807, 10-2006-0028020 and 10-2006-0040187 filed in Korea on Aug. 26, 2005, Mar. 28, 2006 and May 3, 2006, respectively, each of which is hereby incorporated by reference in their entirety.

BACKGROUND OF THE INVENTION

1. Field of the Invention

The present invention relates to a mobile telecommunication handset.

2. Description of the Background Art

A mobile handset including a cellular phone, a personal communication system, a personal digital assistant, a handheld phone, etc. is small in size and is light in weight. The handset provides voice communication capabilities as well as multimedia functions. However, because the handset is relatively small in size, it is difficult to perform the various functions provided by the handset.

SUMMARY OF THE INVENTION

Accordingly, one object of the present invention is to address the above-noted and other problems.

Another object of the present invention is to provide a touch pad on a mobile handset that is easy to use.

To achieve these and other advantages and in accordance with the purpose of the present invention, as embodied and broadly described herein, the present invention provides in one aspect a mobile telecommunication handset including a display unit configured to display information, a touch pad configured to generate input when being touched, and a control unit configured to control the display unit and the touch pad and to perform a function corresponding to the generated input from the touch pad being touched. Further, the control unit activates or deactivates the touch pad based on at least one from a state of the mobile handset or an input external from the touch pad.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
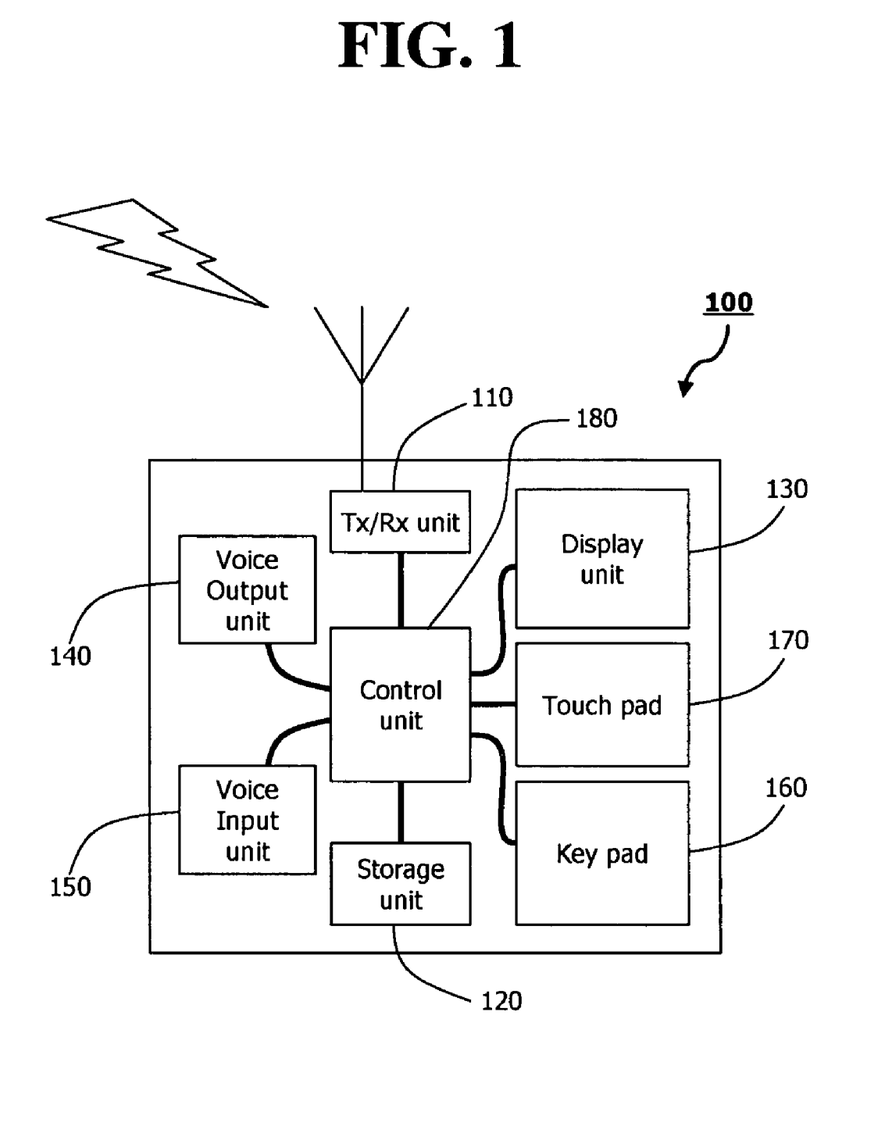
FIG. 1 is a block diagram showing a sliding-type mobile handset having a touch pad according to an embodiment of the present invention.

FIG. 1 is a block diagram showing a mobile telecommunication handset 100 according to an embodiment of the present invention. As shown, the handset 100 includes a storage unit 120 for storing data, a display unit 130 including a user interface for providing a variety of information to the user, a touch pad 170 having keys or buttons that are touched by the user to activate desired functions, and a control unit 180 for controlling the various units included in the handset 100. The control unit 180 also performs a function that is selected by the user.

The mobile handset 100 also includes a transmitting/receiving unit 110 for transmitting and receiving signals, a voice output unit (e.g., speaker) 140 for outputting a voice signal or sound, a voice input unit (e.g., microphone) 150, and a keypad 160 including keys that are pressed by the user (e.g., to enter a phone number to be dialed). Further, in addition to the display unit 130 shown in FIG. 1, the handset 100 may also include a secondary display unit. The touch pad 170 may also be provided below the display unit 130 or the secondary display unit.

Further, the touch pad 170 is a touch-sensitive user interface, which detects a change of capacitance, for example, when it is touched. For example, a user can simply touch the touch pad 170 using his or her finger or using a stylus to activate a function corresponding to a key on the touch pad. The touch pad 170 is different than the key pad 160. That is, to activate a function on the key pad 160, the user must press (and not merely touch) a particular key corresponding to the function. Simply touching the key on the key pad 160 will not activate the function. On the contrary, the user may simply touch a key on the touch-sensitive touch pad 170 to activate a desired function.

In addition, because the touch pad is touch-sensitive, the present invention advantageously activates and deactivates the touch pad based on a state of the mobile handset. For example, on a sliding-type handset, the user opens the handset by sliding the cover open. Thus, in this instance, the user may inadvertently touch the touch pad when opening the handset. Therefore, the present invention advantageously deactivates the touch pad when the sliding-type handset is opened. The different activation and deactivation states of the touch pad 170 will be described in more detail with respect to FIGS. 2-5. In addition, as will discussed in more detail later, the touch pad is activated or deactivated by the control unit 180. The touch pad 170 may also be deactivated (or re-activated) via an external input key on the terminal.

Further, the deactivated state includes two modes. The first mode is a mode in which no input is generated from touching the keys on the touch pad, and the second mode is that the touch pad is activated whenever the touch pad is touched or a particular touch key is pressed for a predetermined length of time. The first and second modes may also be selected from a set up menu. In addition, during the deactivation state, all of the keys on the touch pad may be deactivated and the backlights for each key are turned off. Alternatively, in the deactivation state, only a portion of the keys may be deactivated and other keys may be activated. It is also possible that some of the keys are deactivated, but that the deactivated key is still lit.

In addition, the mobile handset 100 may also include a locking mechanism. That is, any input from the touch keys on the touch pad is disabled either in the deactivated or activated state, when the locking mechanism operates. Further, the touch pad generally includes a plurality of touch keys. Thus, in one embodiment, some of the touch keys may be activated while other keys may be deactivated. The selective activation or deactivation of the touch keys is performed by the control unit 180.

In addition, although not shown in FIG. 1, a backlight or light emitting device may be used to provide illumination to keys on the touch pad 170. In this instance, a specified area or the entire area of at least one touch key is lit when the touch pad 170 is in the activated state. Further, as discussed above, in one embodiment, the touch keys are not lit when the touch pad 170 is in the deactivated state. However, it is also possible that a key be deactivated but still be lit. Also, a portion of the touch pad 170 may be made of the same material as an external housing of the mobile handset 100, thereby making the touch pad 170 not apparent to the user in the deactivated state when the corresponding back light is turned off.

Further, the control unit 180 may also display or announce messages to assist the user in operating the touch pad 170 when the touch pad 170 is activated. Also, the slide-type handset is opened and closed by sliding an upper portion of the handset up or down, respectively, and the folder-type handset is opened and closed by folding open and folding closed the upper portion, respectively. In addition, the display unit 130 may also display screen images explaining the function corresponding to each touch key on the touch pad 170

The touch pad 170 also includes a proximity sensor (not shown), such as a capacitive sensor, enabling the touch pad to operate by sensing the capacitance of an object (e.g., a finger) touched on the touch pad. Alternatively, the touch pad 170 may include a heat sensor which operates in a specified temperature range based on a body temperature. Thus, in this instance, the touch pad 170 only operates when a human finger touches it.

Further, the handset 100 may include an input terminal that can be connected to an external input device such as a keyboard, and an output terminal that can be connected to an external display apparatus such as a television set, computer monitor, or speaker, for example. Also, the handset 100 may include a slotted area for receiving an external storage media such as a memory card or a module having an additional function such as a broadcast receiving module, a camera module, an MP3 module, an Internet banking module, etc.

Figure 2:
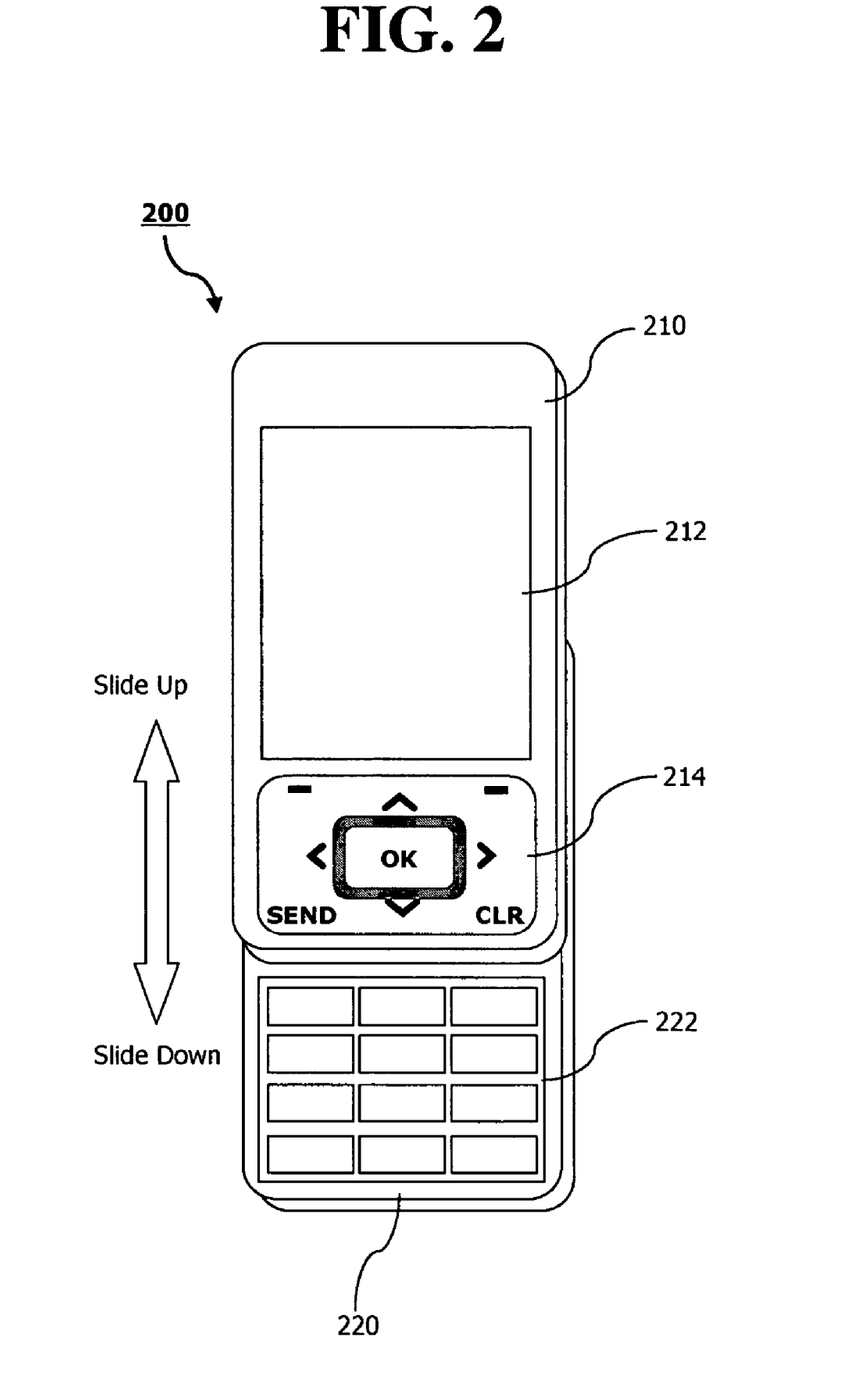
FIG. 2 is an overview showing an external appearance of the sliding-type mobile handset having the touch pad according to the embodiment of the present invention.

Turning now to FIG. 2, which is an overview showing an external appearance of a sliding-type mobile handset 200 according to an embodiment of the present invention. As shown, the handset 200 includes a main body 220 and a sliding body 210 having a touch pad 214. The sliding body 210 and the main body 220 are connected to each other in a sliding manner. Further, the sliding body 210 is slid up and down with respect to the main body 220 to open and close the mobile handset 200. The main body 220 may also include a camera and a battery (not shown) on the back side of the main body 220.

Figure 3A:
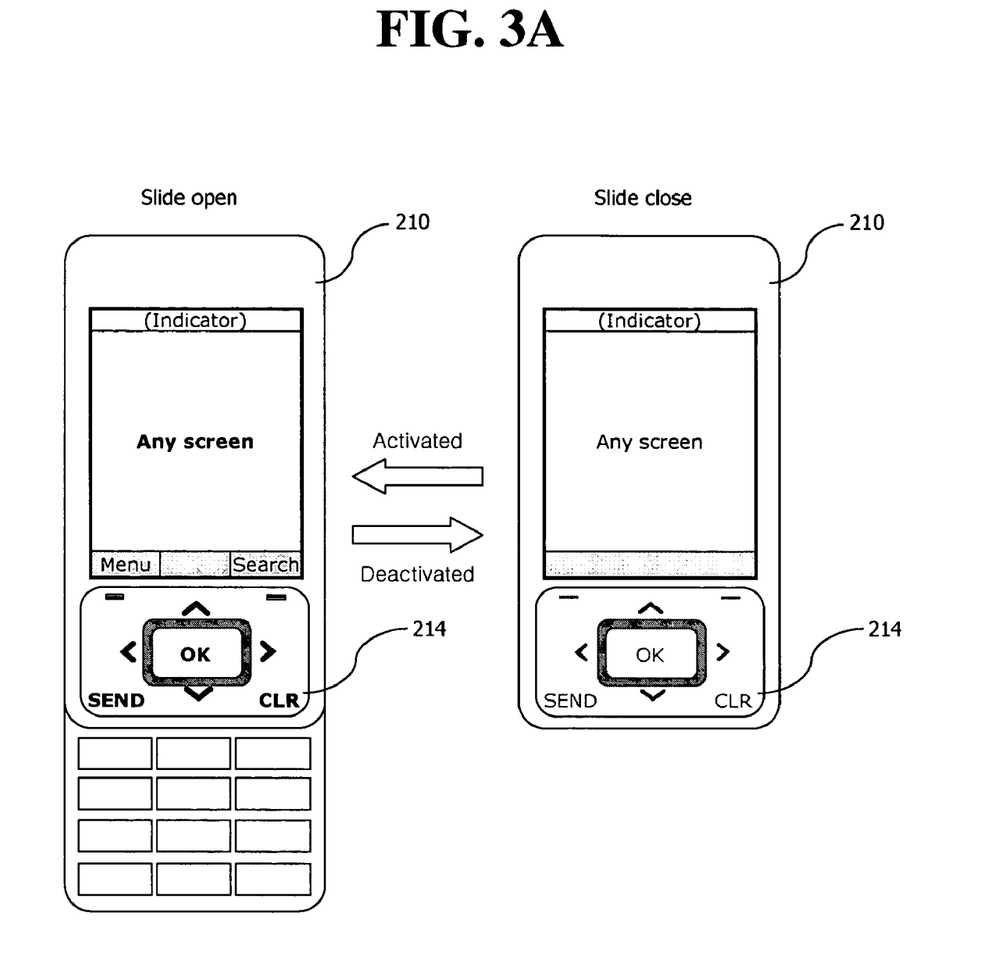
FIGS. 3A to 3G are overviews showing how the touch pad is operated in the sliding-type mobile handset having the touch pad according to the embodiment of the present invention.

Turning next to FIGS. 3A-3G, which are overviews illustrating how the touch pad 214 is activated and deactivated according to an embodiment of the present invention. As shown in FIG. 3A, the touch pad 214 is activated when the sliding body 210 is slid open, and is deactivated when the sliding body 210 is slid closed. That is, in FIG. 3A, boldfaced characters and lines on the display indicate that the touch pad 214 is activated and the backlight is turned on, and regular typeface characters and lines on the display indicate that \ the touch pad 214 is deactivated and the backlight is turned off.

In addition, in the example in FIG. 3A, each touch key is deactivated and is not lit (i.e., the backlight for each touch key is turned off). However, as discussed above, some of the touch keys may remain lit. Further, the touch keys on the touch pad 214 are advantageously deactivated when the user is sliding open the sliding body 210 to prevent the user from inadvertently inputting information if he or she accidentally touches the touch keys when sliding open the sliding body 210. When the sliding body 210 is all the way open, the touch pad 214 is activated.

Figure 3B:
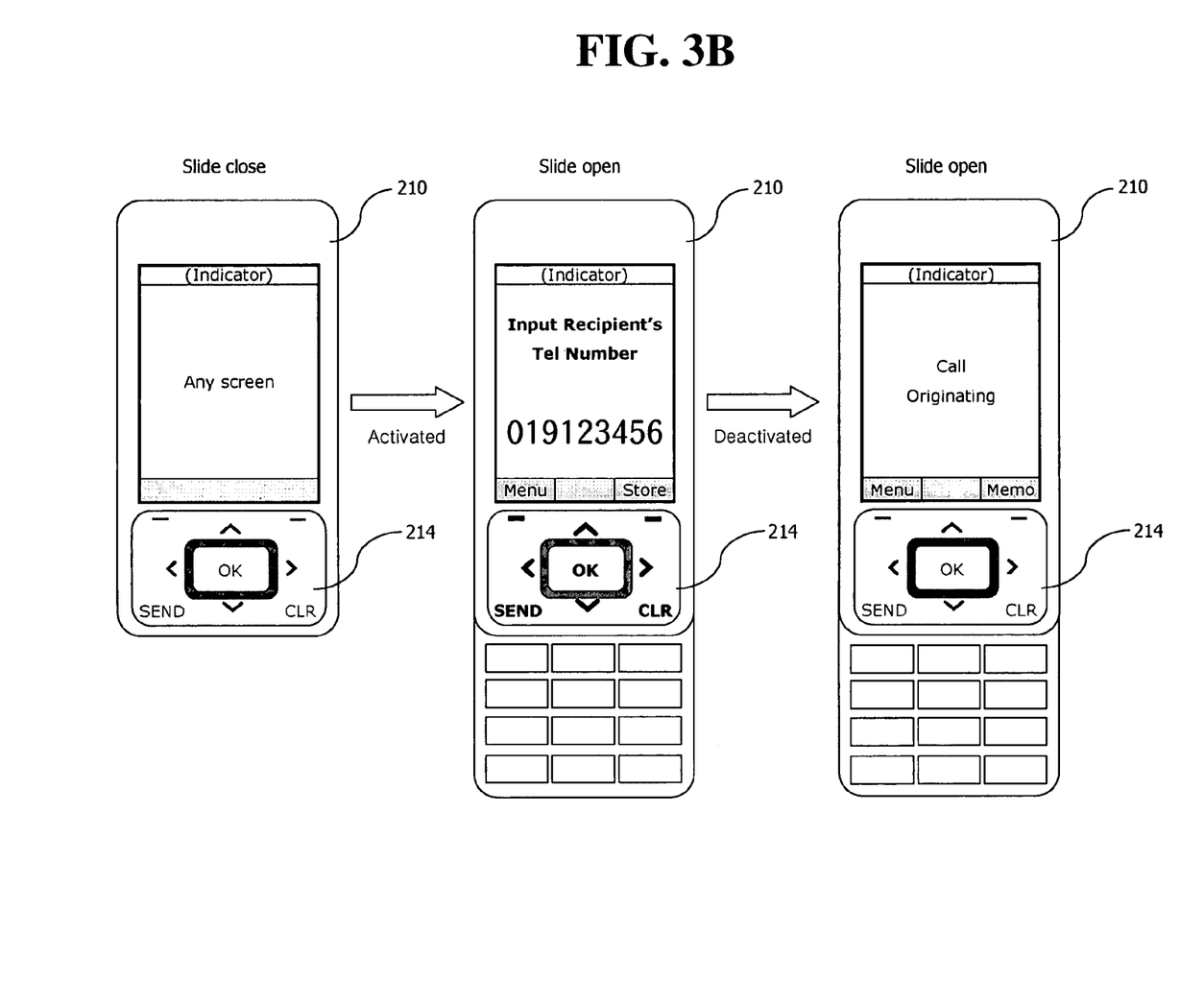

In addition, as shown in FIG. 3B, the touch pad 214 is activated when the user slides open the sliding body 210. The user can then enter a party's telephone number. However, when the call is originated, the touch pad 214 is deactivated. Thus, if the user touches the touch pad 214 after the call is originated, no further information is generated. For example, the user may inadvertently touch the touch pad 214 against his or her ear when talking to the other party. However, because the touch pad 214 is deactivated, erroneous inputs would not occur (e.g., the other party would not hear inputs generated by inadvertently pressing keys on the touch pad 214, etc.)

Figure 3C:
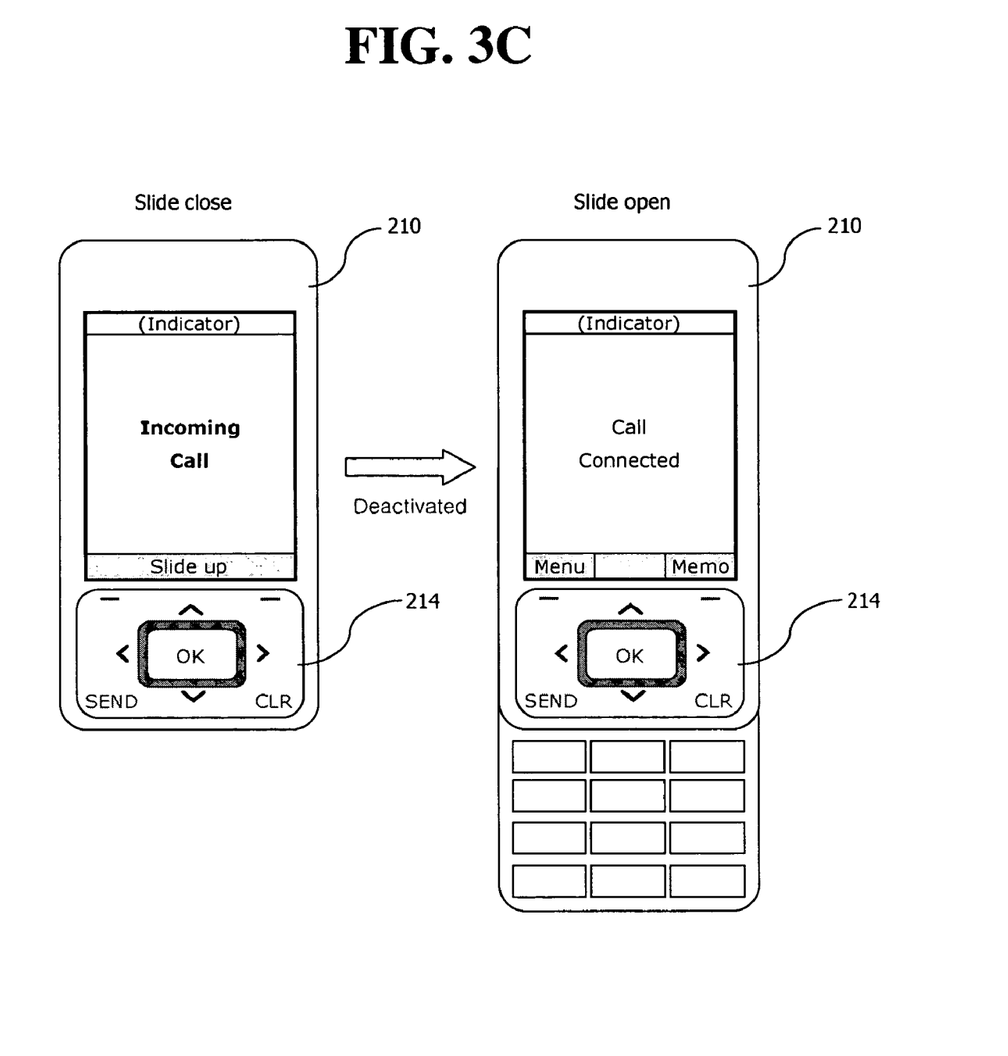
Figure 3D:
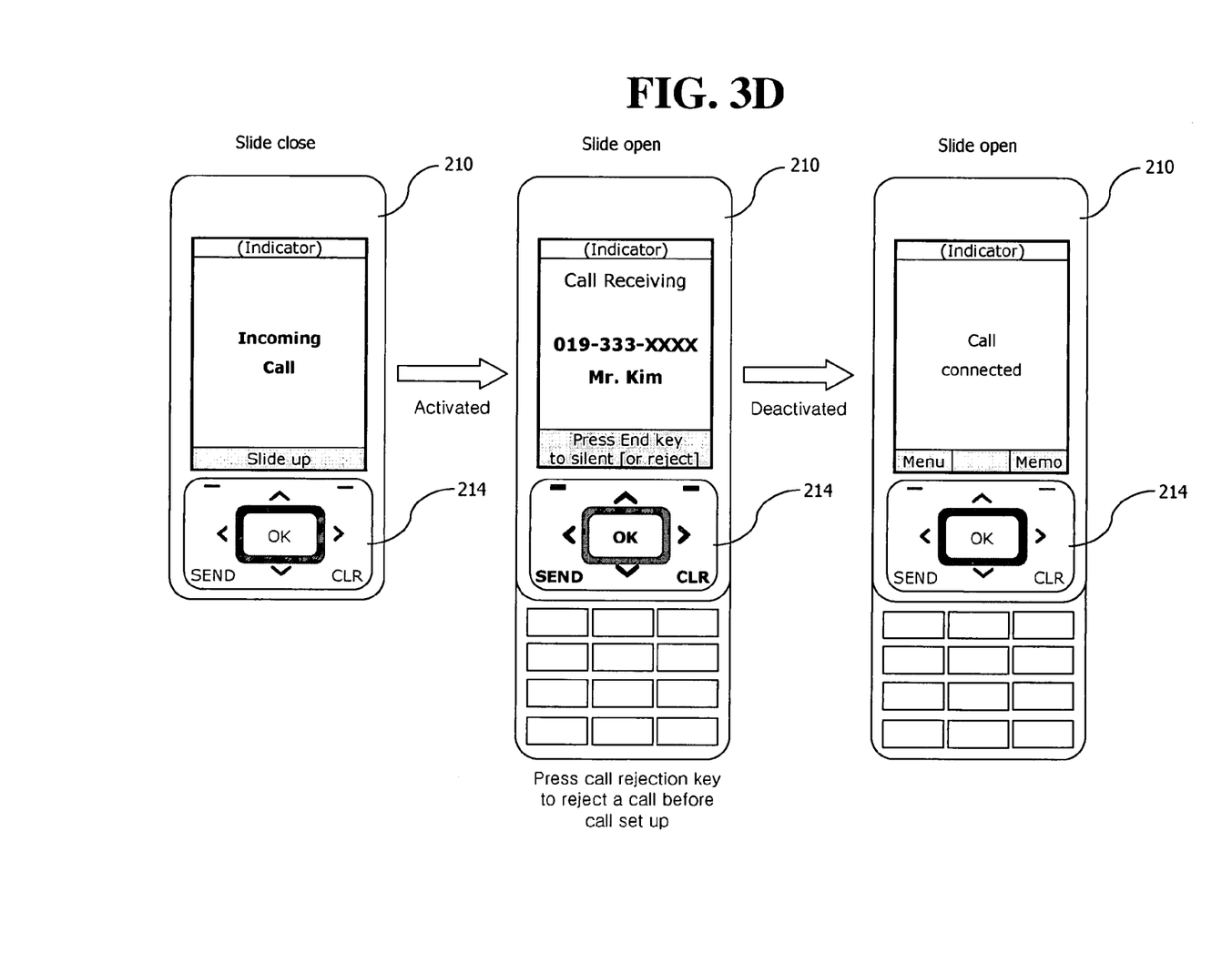
Figure 3E:
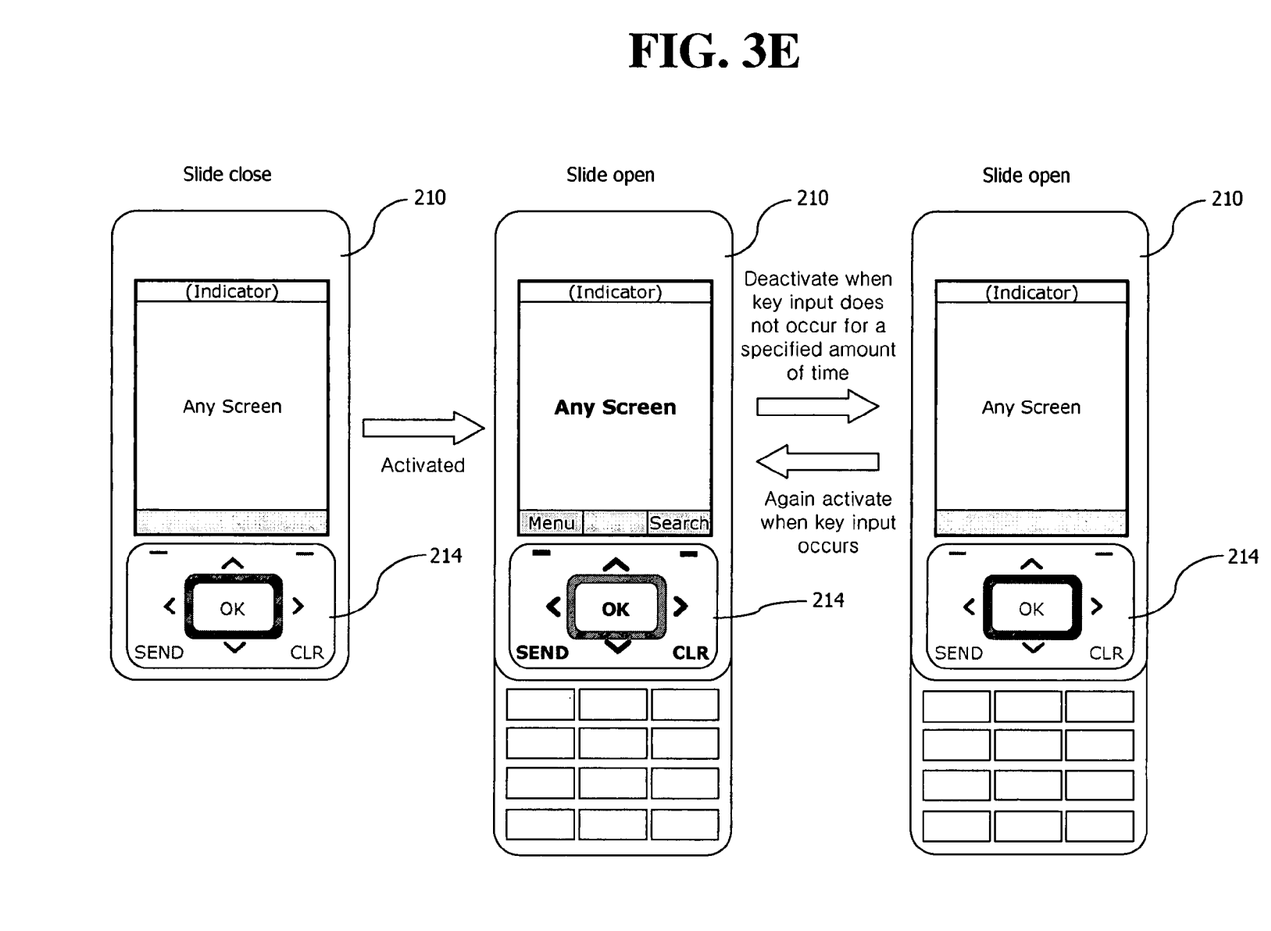

Further, as shown in FIG. 3C, the touch pad 214 is deactivated after the sliding body 210 is slid open to receive an incoming call. Alternatively, as shown in FIG. 3D, the touch pad 214 may be activated when the user first receives a call and opens the sliding body 201. Thus, the user can turn off a ring tone or vibration indicating a call has arrived, or reject the call by touching one of the touch keys or pressing a function key such as an "END CALL" key. Also, with reference to FIG. 3C, when the user presses another key besides the call rejection key, the call is connected, and the touch pad 214 is deactivated Further, as shown in FIG. 3E, the touch pad 214 may be deactivated to save battery power when the user has not touched the touch pad 214 and/or the key pad 224 (see FIG. 2) for a predetermined time period after the sliding body 210 is slid open. The predetermined time period may also be variably set by the user. In addition, the touch pad 214 may also be re-activated when the user touches the touch pad 214. In addition, with reference to FIGS. 3B-3D, the touch pad 214 can be activated when a call is first sent or received, deactivated when the sent or received call is connected, and then re-activated when the sent or received call is disconnected.

Figure 3F:
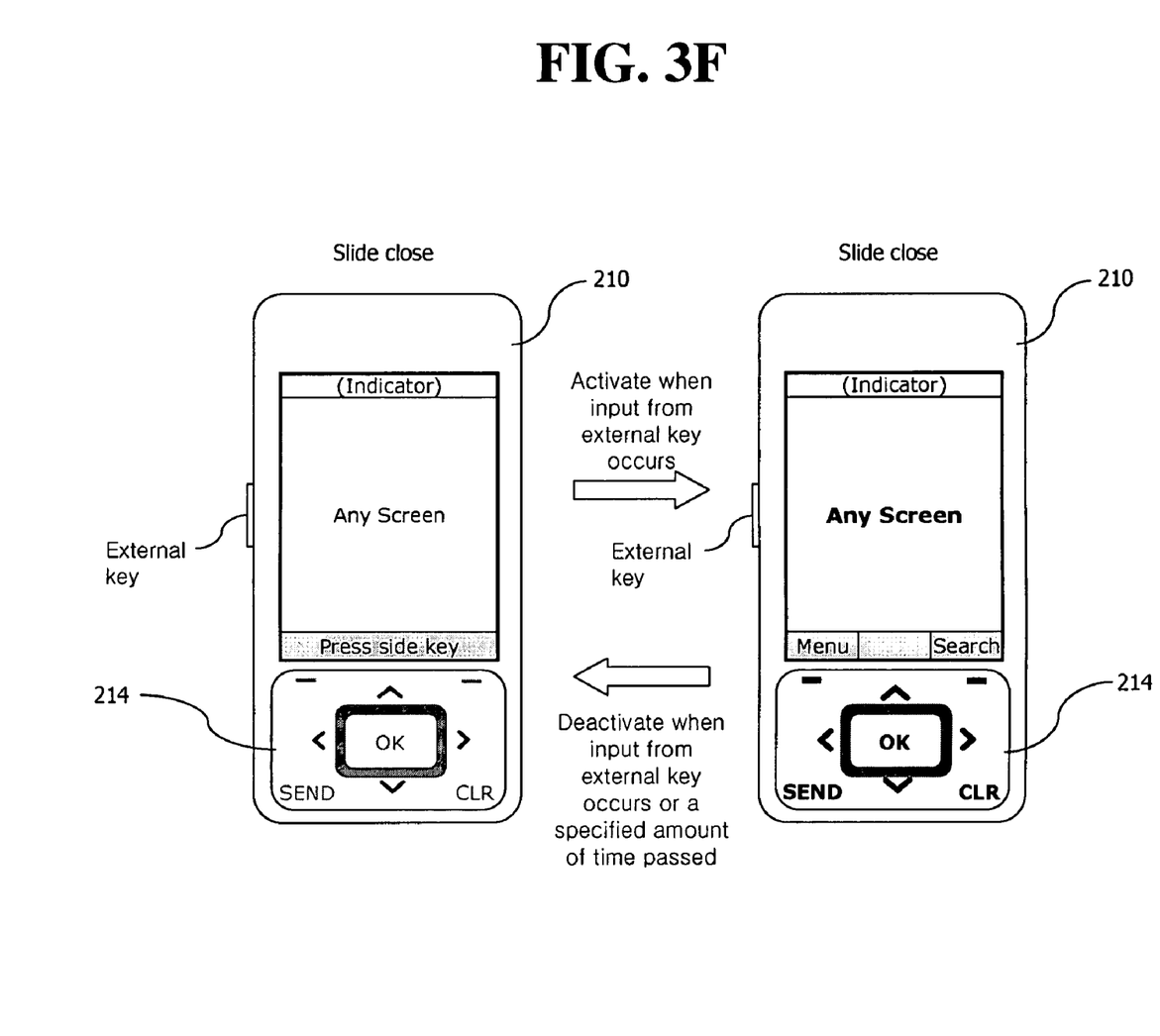

In addition, with reference to FIG. 3F, the touch pad 214 may be activated by pressing an external key when the sliding body 210 is closed. Thus, in this instance, the user can perform functions such as viewing a telephone directory, searching a mail box for new mail, etc. For example, the touch pad 214 may be activated by double pressing the external key such as a key on the side of the handset. The external key may also be used to re-activate the touch pad 214 when the user is receiving or sending a call or be used to deactivate the touch pad 214. In addition, when the sliding body 210 is closed, the touch pad 214 is deactivated until the external key is pressed. If the external key is not pressed, the touch pad 214 remains deactivated.

Figure 3G:
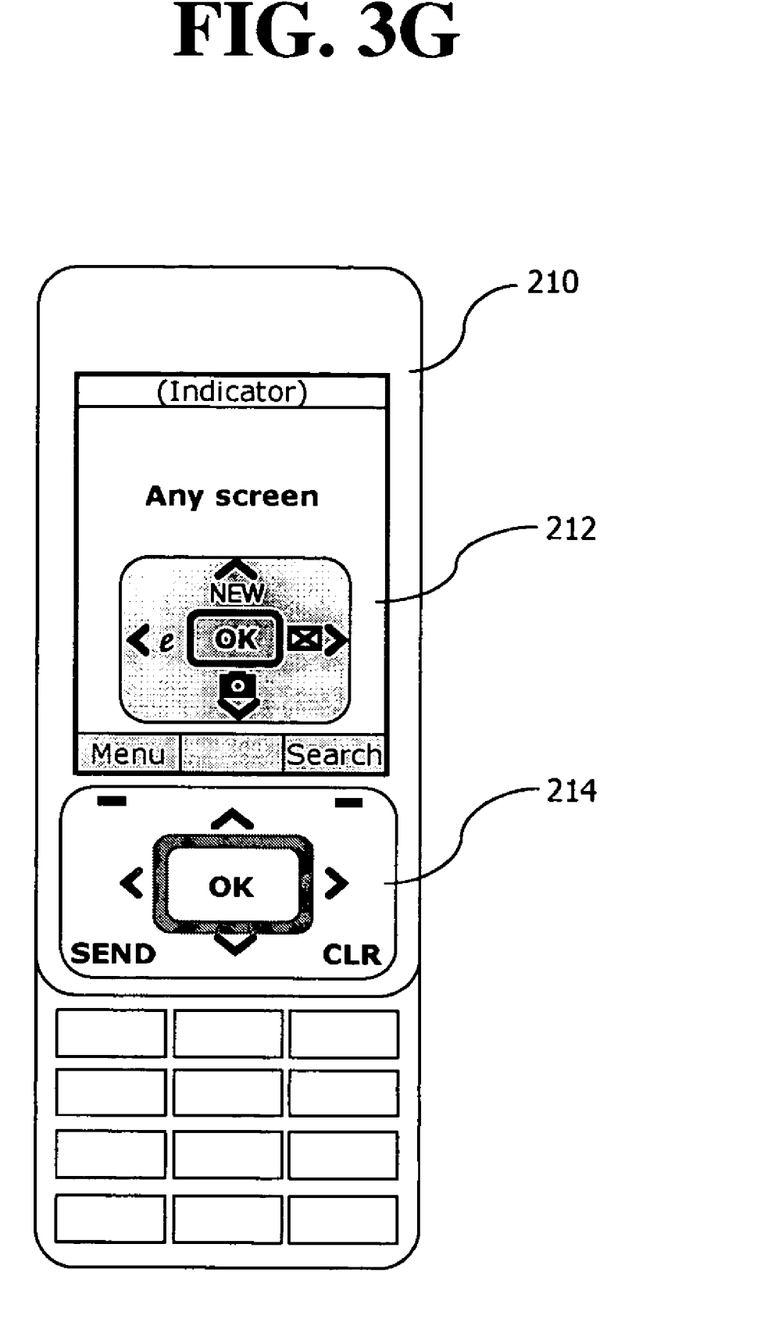

The activation and deactivation of the touch pad 214 may be variably set by the user. For example, the user may select a "locked" option from a setting menu to deactivate the touch pad 214 for all events when the sliding body 210 is closed. Thus, in this instance, even if the external key is pressed, the touch pad 214 is still not activated. If the user selects an "unlocked" option from the setting menu, the touch pad 214 may be activated when the sliding body 214 is closed by pressing the external key. In addition, as shown in FIG. 3G, when the sliding body 210 is opened, a portion of the touch pad 214 may be displayed in a graphic form on the display unit 212 to illustrate the functions of each button to the user.

In the above-described embodiment, the sliding body 210 is slid up to open the handset and slid down to close the handset. However, the present invention may also be applied to situation in which the handset is opened when the sliding body is slid down and is closed when the sliding body is slid up. That is, the touch pad may be activated or deactivated depending on the sliding motion of the sliding body.

Further, the above description relating to the sliding-type phone also applies to a rotate or swivel-type phone in which the sliding body is rotated or swiveled away from the main body. Also, in the rotate or swivel-type phone, the touch pad may be disposed on the main body rather than on the sliding body.

Figure 4:
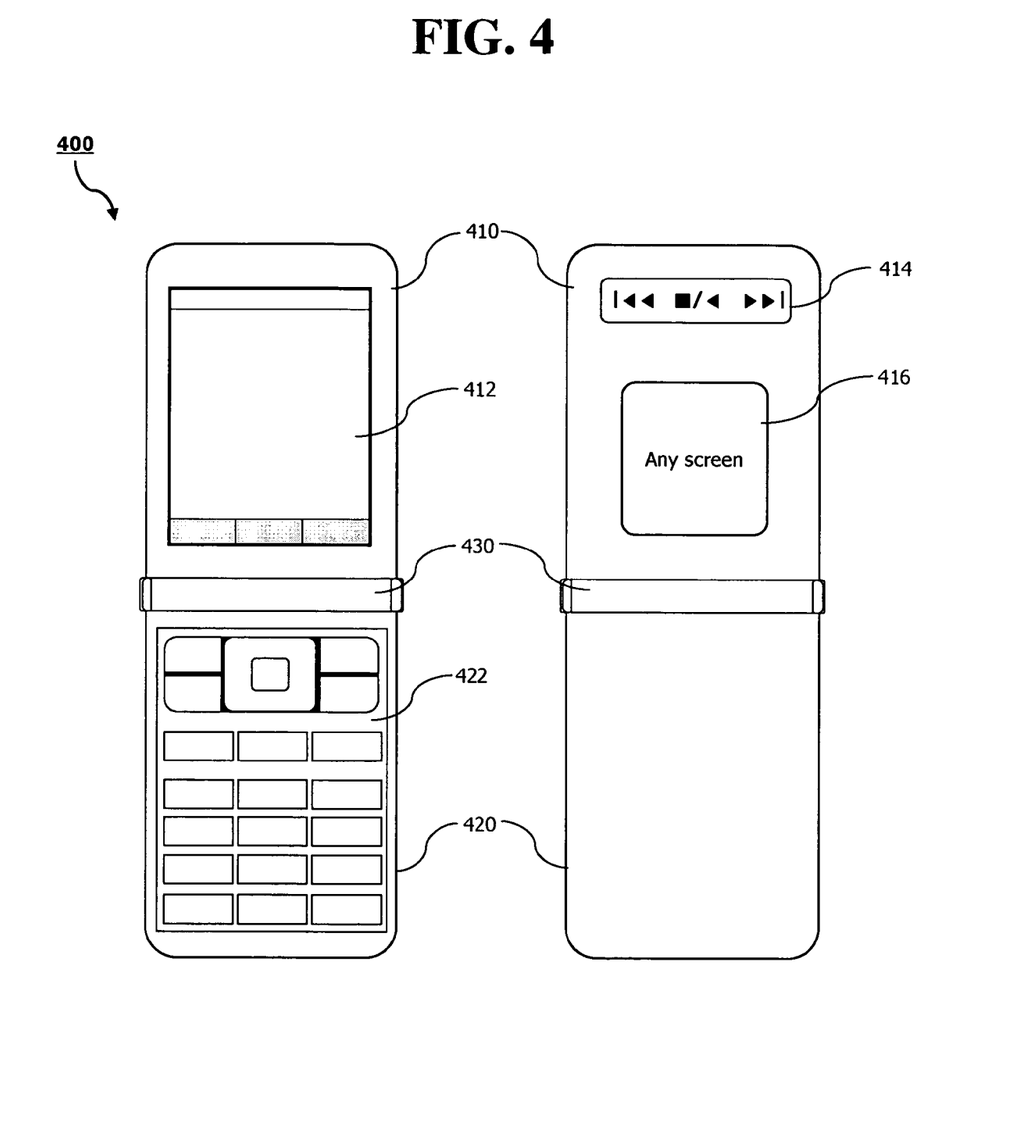
FIG. 4 is an overview showing an external appearance of a folding-type mobile handset having a touch panel according to another embodiment of the present invention.

Turning next to FIG. 4, which is an overview showing an external appearance of a flip-type or folding-type mobile handset 400 according to another embodiment of the present invention. As shown, the handset 400 includes a cover 410 and a main body 420. Further, the cover 410 has a main display unit 412 on one side and a sub display unit 416 and a touch pad 414 on an outside of the handset 400.

In addition, the main body includes a key pad 422, and the cover 410 and main body 420 are connected in a hinge-like connection manner via a hinge portion 430. Thus, the cover 410 is swung or flipped open to open the handset 400 and swung or flipped close to close the handset 400. Further, in this embodiment, the touch pad 414 is provided below the sub display unit 416 (as viewed when the handset 400 is in a closed state). In addition, the main body 420 also includes a battery and a camera (not shown) or alternatively the cover 410 may include the camera.

Figure 5A:
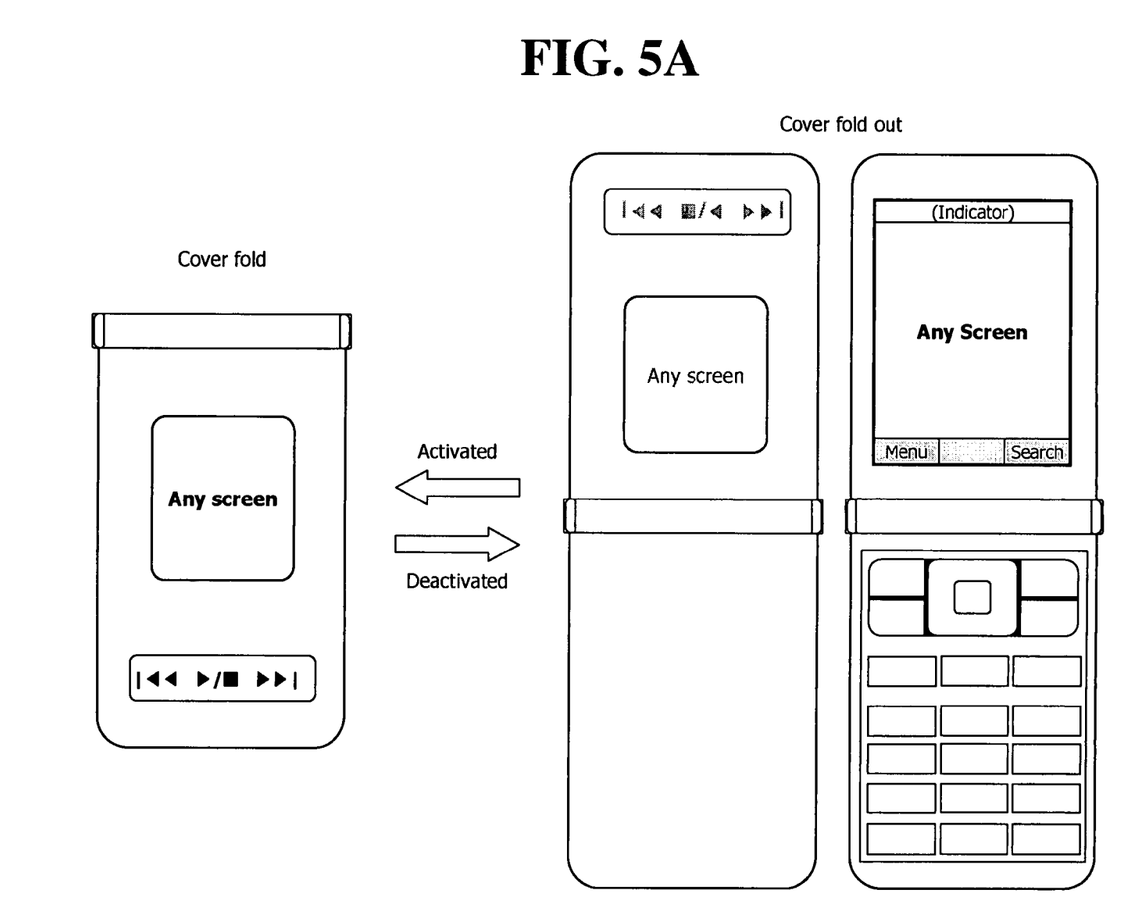
FIGS. 5A to 5D are overviews showing an operation of the touch pad in the folding-type mobile handset according to the another embodiment of the present invention.

Turning next to FIGS. 5A-5D, which are overviews illustrating how the touch pad 414 is activated and deactivated according to the second embodiment of the present invention. As shown in FIG. 5A, the touch pad 414 is activated when the cover 410 is swung shut to close the handset 400 or when a predetermined amount of pressure is applied to the touch pad 414. Further, the touch pad 414 is deactivated when the cover 410 is swung open to open the handset 400. Similar to that discussed above, in the drawings, boldfaced characters and lines on the display indicate that the backlight is turned on and regular typeface characters and lines on the display indicate that the backlight is turned off. In addition, when the cover 410 is first opened, the touch pad 414 may be deactivated to prevent an erroneous input if the user inadvertently touches a key on the touch pad 414 when opening the cover 410.

Figure 5B:
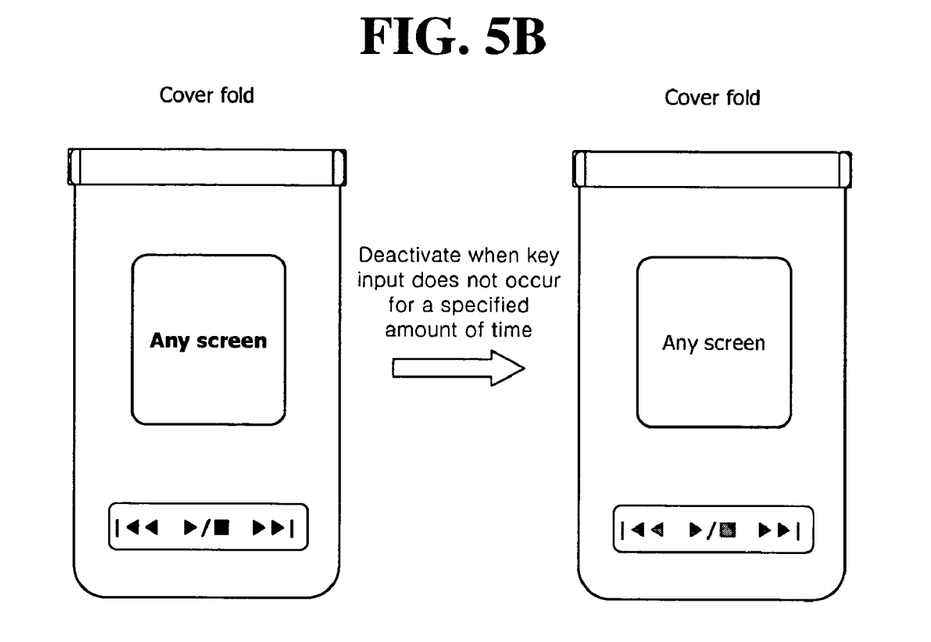
Figure 5C:
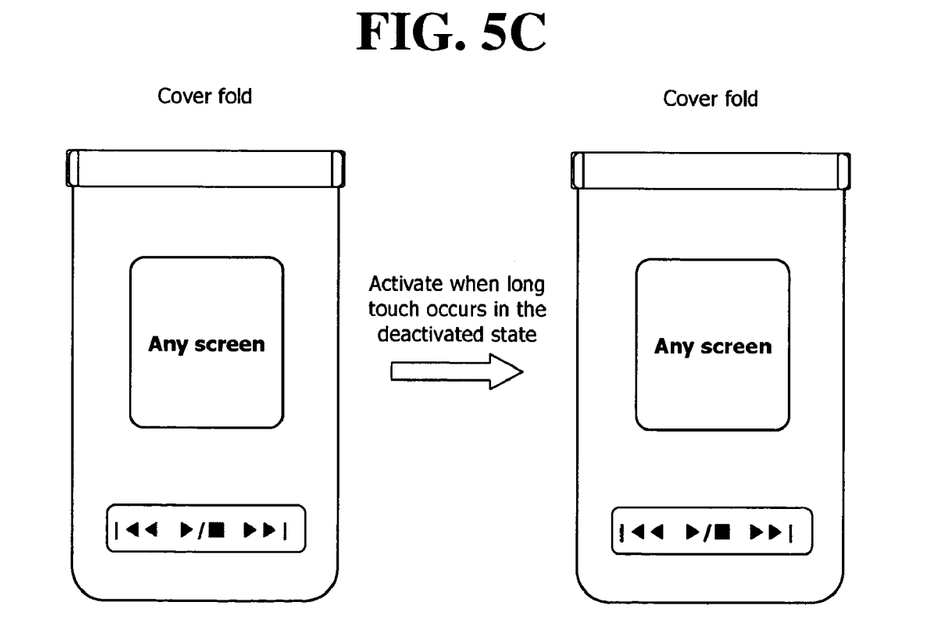

In addition, as shown in FIG. 5B, the touch pad 414 is deactivated after a predetermined amount of time passes with the handset 400 being closed. In FIG. 5C, the touch pad 414 is activated when a touch key on the touch pad 414 is touched for an amount of time that is longer than the predetermined amount of time. For example, a PLAY button may be touched to activate the touch pad 414. Rather than touching the key for the longer time period, it is also possible to activate the touch pad 414 by touching a key for a short time, doubling touching a key, etc.

Figure 5D:
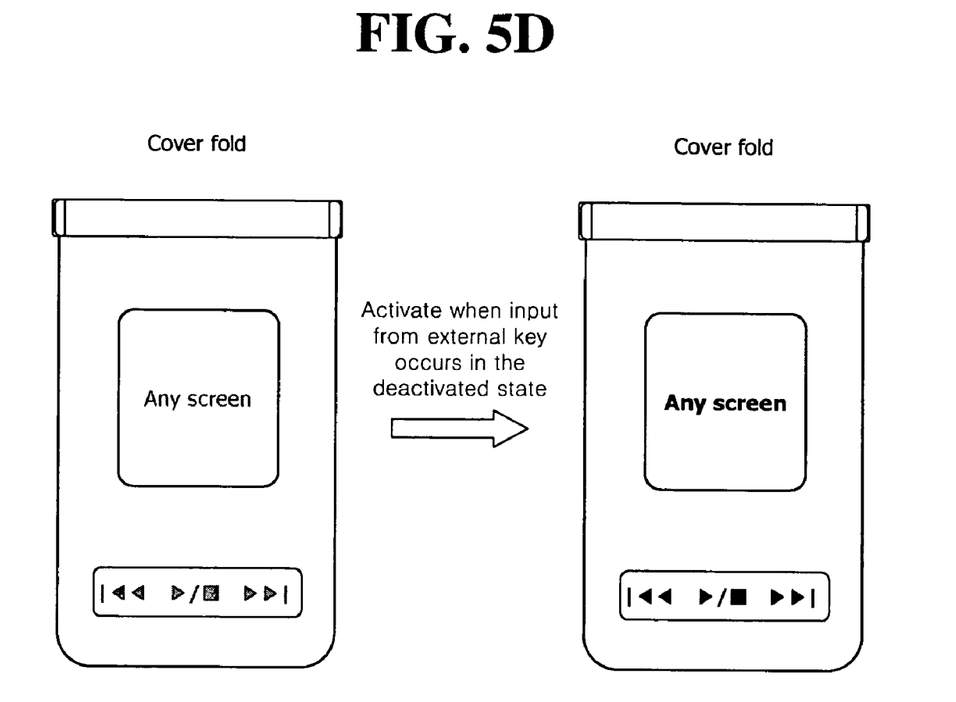

Further, as shown in FIG. 5D, the touch pad 414 can be activated by pressing an external key, for example, when the cover 410 is closed. Thus, the user can perform a variety of functions such as playing a MP3, etc. Again, the external key may be provided on the side of the terminal. In addition, the external key may be pressed for a certain time period, double pressed, etc. to activate the touch pad 414 when the cover 410 is closed. Also, when the cover 410 is swung open, the touch pad 414 is deactivated regardless of the earlier state of the touch pad 414 such that if the user touches the keys on the touch pad 414, input information is not erroneously generated.

Further, the touch pad 414 may be activated or deactivated based on a user's preference or setting. For example, and as discussed above, if the user selects the option "locked" from a setting menu, the touch pad 414 is deactivated so that no functions are performed regardless of the state of the handset 400. If the user selects the option "unlock", the touch pad 414 is activated when a touch key on the touch pad 414 or an external key is touched.

Thus, the mobile handset having the touch pad according to the present invention provides an easy-to-use input system. Further, the user is able to easily select options and perform functions by simply pressing a corresponding touch key. In addition, because the touch pad makes using the handset easier, it is possible to also make the handset smaller.

Figure 6:
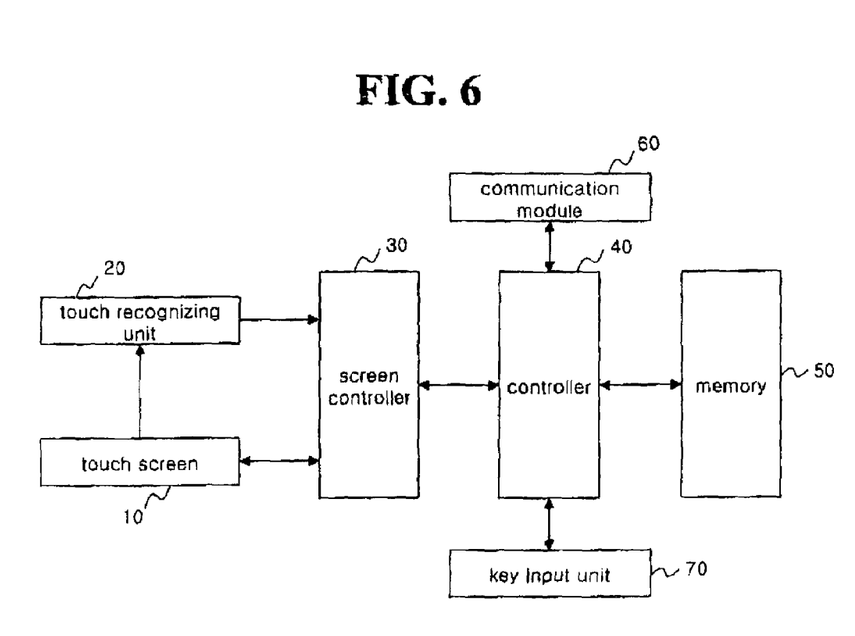
FIG. 6 is a block diagram showing a mobile terminal having a touch screen according to another embodiment of the present invention.

FIG. 6 is a schematic block diagram showing a mobile terminal having a touch screen according to another embodiment of the present invention. As shown in FIG. 1, the mobile terminal includes a touch screen 10 that shows a screen image with soft keys (icon buttons) and multiple graphical indicators (or other types of visual icons), a screen controller 30 that processes various touch inputs made on the touch screen 10, a communication module 60 that transmits and/or receives call signals and data, a controller 40 that transfers data signals with respect to an output screen image to the screen controller 30 when a call signal is received from the communication module 60, a touch recognizing unit 20 to recognize a contact point (area) of the touch screen 10 that is touched by the user, a key input unit 70 to receive inputs from buttons of a keypad (or other peripheral device of the mobile terminal and the touch screen 10) that are operated by the user, and a memory 50 to store information or contents that change due to operations performed via the touch screen 10 or to store an initial value of a screen image.

On the touch screen 10, the multiple key buttons and the multiple indicators are displayed to configure a screen image upon receiving output data according to a touch input from the screen controller 30. The screen controller 30 transfers the data required for configuring the screen image to the touch screen 10 through a control signal applied from the controller 20 to display an image, and receives screen image information and data of changed contents while operations on the touch screen are being performed.

When a call signal is received via the communication module 60, the screen controller 30 receives the control signal from the controller 40, stops an operation on the currently displayed (i.e., image operations being worked on) screen image of the touch screen, receives data regarding an operation, and stores it in the memory 50 under the control of the controller 40.

At this time, the screen controller 30 automatically changes the touch screen 10 to a locked mode in which a touch input does not work, and outputs a screen image with an unlock button on the touch screen 10. Here, in the locked mode, a touch input to the touch screen 10 is prevented by cutting off or disregarding a signal inputted to the touch screen 10, to thus prevent a touch input on the touch screen 10.

With the touch screen 10 operating in the locked mode, when the unlock button displayed on the touch screen 10 is selected, the screen controller 30 releases the locked mode. Here, the screen controller 30 transfers input data with respect to touch inputs of the multiple indicators and the key buttons of the touch screen 10 so as to be stored in the memory 50 through the controller 40, and transfers output data according to an input to the touch screen 10 so as to be displayed on the screen 10.

In this instance, when the locked mode is released by the unlock button during a call, if a touch input is not applied for a certain time period, the screen controller 30 automatically changes the touch screen 10 to the locked mode and stores the changed content and data with respect to the operation screen image in the memory 50 through the controller 40.

When the call is terminated, the screen controller 30 releases the locked mode with respect to the touch input on the touch screen 10, receives the data with respect to the changed content and operation screen image stored in the memory 50 through the controller 40, and applies a screen image control signal for recovering the screen image to the touch screen 10 to display a screen image.

The operation of the mobile terminal described above will be described with respect to FIG. 7, which is flow chart illustrating a method controlling a screen 10 image of the touch screen when a call signal of the mobile terminal available for controlling a screen image of its touch screen is received according to the embodiment of the present invention. FIG. 6 will also be referred to in this description.

Figure 7:
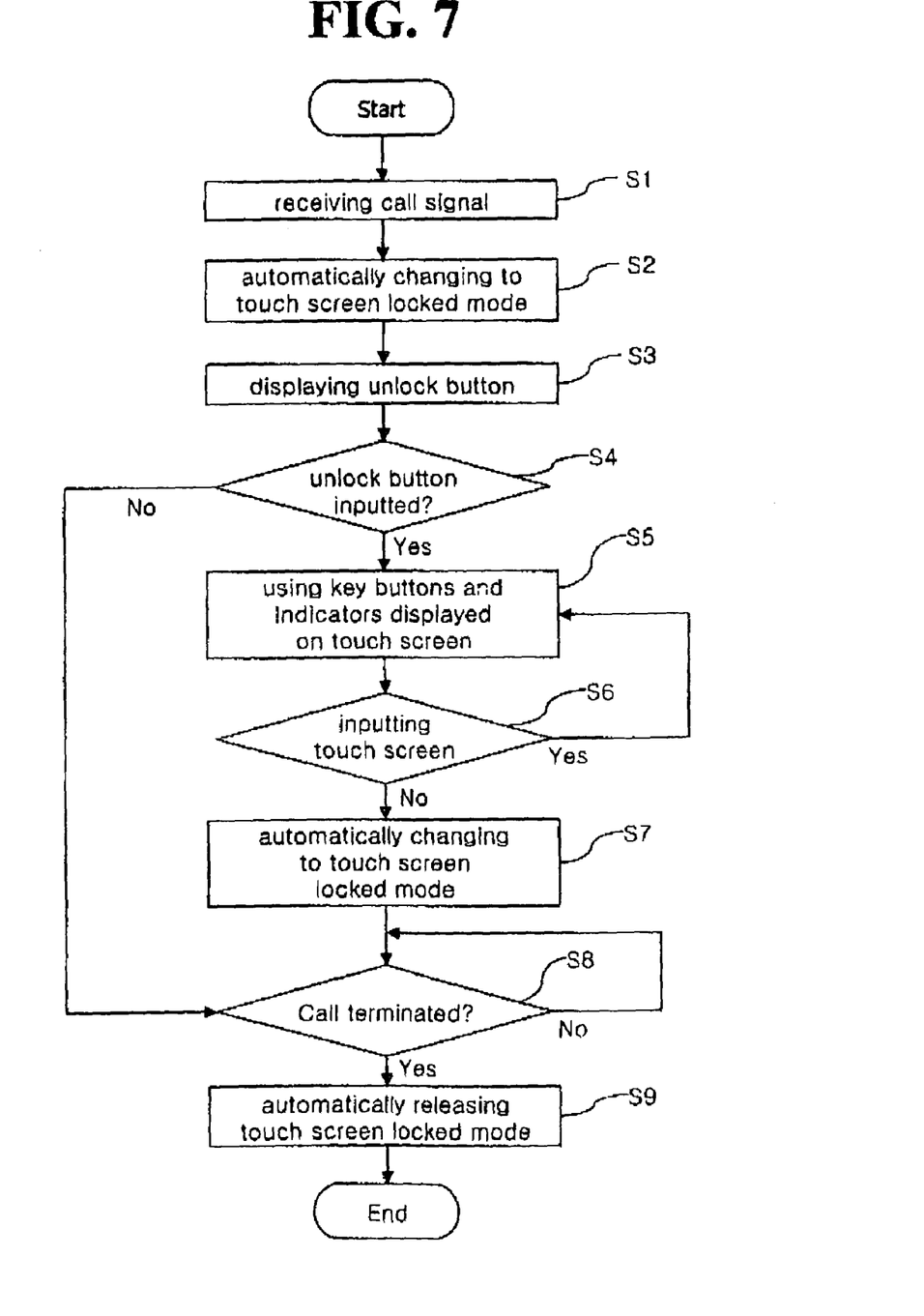
FIG. 7 is a flow chart illustrating the process of a method for operating the mobile terminal having a touch screen according to another embodiment of the present invention.

As shown in FIG. 7, call signal is received while a menu is selected or while the multiple key buttons or the multiple indicators are used (S1). Upon receiving the call signal, a screen image control signal is transferred to the touch screen 10 to automatically change the touch screen 10 to the locked mode in which a touch input on the touch screen 10 is prevented, and information on the operation screen image is stored (S2).

At this time, when the touch screen is changed to the locked mode, an unlock button for setting or releasing the locked mode manually is displayed on the touch screen (S3). Further, when the unlock button is manipulated or selected (touched) during the call, the locked mode is released and the multiple key buttons and the multiple indicators are displayed on the screen 10 to allow a touch input on the touch screen (S4, S5).

In this instance, when touch inputs are continued using the multiple key buttons and the multiple indicators, corresponding data is input (yes in S6), and if there is no touch input for a certain time period (no in S6), the touch screen is automatically changed to the locked mode to prevent a touch input (S7). When the call is terminated (no in S8), the set locked mode is automatically released (S9). After the locked mode is released, the data with respect to the initially stored operation screen image is displayed on the touch screen.

As described above, in this embodiment of the present invention, when a call is received, the touch screen is changed to the locked mode. However, the touch screen can also be changed to a state that only manipulation of a certain key (an end key, etc.) is prevented.

Thus, the mobile terminal in the embodiment has several advantages. When a call is received, a particular key input on the touch screen is prevented or the touch screen is locked, and a separate unlock button can be displayed for a key input to take a note or the like, during a call. Thus, malfunction of the mobile terminal caused by an erroneous input of the touch screen during the call is prevented and power consumption is reduced, and thus, the quality and competitiveness of the product is improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A mobile communication terminal comprising:
a touch screen configured to display a touch screen unlock button for unlocking the touch screen, and
a screen controller configured to either automatically lock the touch screen or to automatically switch an operating mode of the touch screen to a lock mode upon receiving a call, and to unlock the touch screen or to cancel the lock mode of the touch screen in response to manipulation of the touch screen unlock button,
wherein, if no touch input is recognized on the touch screen for more than a predetermined amount of time after the manipulation of the touch screen unlock button, the screen controller is further configured to either relock the touch screen or to switch the operating mode of the touch screen back to the lock mode.

2. The mobile communication terminal of claim 1, wherein, if the screen controller relocks the touch screen or switches the operating mode of the touch screen back to the lock mode, the screen controller is further configured to redisplay the touch screen unlock button.

3. The mobile communication terminal of claim 1, wherein, if a call is terminated, the screen controller is further configured to unlock the touch screen and to remove the unlock button from the display or to switch the operating mode of the touch screen to an unlock mode.

4. The mobile communication terminal of claim 1, wherein the screen controller is further configured to unlock the touch screen or to cancel the lock mode in response to manipulation of the unlock button.

5. An operating method of a mobile communication terminal having a touch screen having a touch screen unlock button for unlocking the touch screen, the operating method comprising:
one of automatically locking the touch screen or automatically switching an operating mode of the touch screen to a lock mode upon receiving a call
unlocking the touch screen or cancelling the lock mode of the touch screen in response to manipulation of the touch screen unlock button; and
if no touch input is recognized on the touch screen for more than a predetermined amount of time after the manipulation of the touch screen unlock button, either relocking the touch screen or switching the operating mode of the touch screen back to the lock mode.

6. The operating method of claim 5, said step of either relocking the touch screen or switching the operating mode of the touch screen back to the lock mode further comprising:
redisplaying the touch screen unlock button.

7. The operating method of claim 5, further comprising:
unlocking the touch screen and removing the unlock button from the display or switching the operating mode of the touch screen to an unlock mode if a call is terminated.

* * * * *